(12) United States Patent
Hagberg (10) Patent No.: US 10,315,211 B1
(45) Date of Patent: Jun. 11, 2019

(54) RETRACTABLE SPRAY SHIELD FOR AGRICULTURAL USE

(71) Applicant: Mark T. Hagberg, Lafayette, MN (US)

(72) Inventor: Mark T. Hagberg, Lafayette, MN (US)

( * ) Notice: Subject to any disclaimer, the term of this patent is extended or adjusted under 35 U.S.C. 154(b) by 248 days.

(21) Appl. No.: 15/407,229

(22) Filed: Jan. 16, 2017

(51) Int. Cl.
| | | |
|---|---|---|
| *B05B 12/24* | (2018.01) | |
| *B05B 1/20* | (2006.01) | |
| *B05B 1/28* | (2006.01) | |
| *B05B 13/00* | (2006.01) | |
| *A01M 7/00* | (2006.01) | |
| *A01C 23/04* | (2006.01) | |

(52) U.S. Cl.
CPC ............ *B05B 12/24* (2018.02); *A01C 23/047* (2013.01); *A01M 7/0042* (2013.01); *A01M 7/0064* (2013.01); *B05B 1/20* (2013.01); *B05B 1/28* (2013.01); *B05B 13/005* (2013.01)

(58) Field of Classification Search
CPC ........... B05B 12/24; B05B 12/20; B05B 1/28; B05B 1/20; B05B 13/005; B05B 12/36; B05B 15/16; A01C 23/047; A01M 7/0042; A01M 7/0064; A01M 7/0075; A01D 2101/00; A47K 3/281; B08B 1/00; A01G 13/02; A01G 13/0206
USPC ......... 239/288–288.5, 103, 77, 78, 159–170, 239/176, 150, 726–733, 754, 172, 275, 239/521; 242/557
See application file for complete search history.

(56) References Cited

U.S. PATENT DOCUMENTS

| | | |
|---|---|---|
| 2,589,020 A | 3/1952 | North, Jr. |
| 3,445,961 A | 5/1969 | Elsworth |
| 3,565,341 A | 2/1971 | Burroughs |
| 3,793,872 A * | 2/1974 | Logan ...................... B21J 13/08 414/680 |
| 4,124,221 A | 11/1978 | Goings |
| 4,274,589 A | 6/1981 | Jones |
| 4,927,080 A | 5/1990 | Alsing |
| 4,947,581 A | 8/1990 | Claussen et al. |
| 4,986,473 A | 1/1991 | Semple et al. |
| 5,062,572 A | 11/1991 | Reiter et al. |
| 5,139,200 A | 8/1992 | Greimann et al. |
| 5,549,457 A | 8/1996 | Flores et al. |
| 7,063,273 B2 | 6/2006 | Hahn et al. |
| 8,066,304 B2 | 11/2011 | Ulgen |
| 8,573,510 B2 | 11/2013 | Bisson et al. |

(Continued)

*Primary Examiner* — Arthur O. Hall
*Assistant Examiner* — Juan C Barrera
(74) *Attorney, Agent, or Firm* — Albert W. Watkins (57) ABSTRACT

A retractable spray shield for agricultural use has a spray barrier; a storage tube; a deployment and concealment drive that in one direction deploys the spray barrier from the storage tube and in a second direction opposed to the first direction conceals the spray barrier within the storage tube; and a pivotal quick release support and boom arm coupling. The spray barrier has a generally triangular and flaccid liquid barrier film, a pair of framing legs coupled to opposed edges of the liquid barrier film, a hinge plate, a pair of pintles coupling the pair of framing legs to the hinge plate, a spring guide post intermediate between the first and second pintles, and a tension spring wrapped about the spring guide post and configured to operatively stretch the pair of framing legs apart from each other and thereby expand the barrier film toward a planar, generally triangular geometry.

18 Claims, 3 Drawing Sheets

(56) References Cited

U.S. PATENT DOCUMENTS

D702,124 S      4/2014   Harrower et al.
2016/0121355 A1*   5/2016   Claussen ............. A01M 7/0064
                                                                      239/164

* cited by examiner

RETRACTABLE SPRAY SHIELD FOR AGRICULTURAL USE

BACKGROUND OF THE INVENTION

1. Field of the Invention

The present invention pertains generally to fluid spraying, and more particularly to a retractable spray shield for agricultural use that deflects the flow from at least one spray nozzle.

2. Description of the Related Art

Modern agriculture has for most of a century advanced in productivity more than many other industries. Most consumers are generally unaware of these significant advances. However, the consumer has benefitted greatly, in particular because of the lower-than-inflation price changes in many agricultural products through this long time period. Most agricultural operations today incorporate extremely technically advanced machinery, seed, and chemicals that allow one person to do the work that even only a few decades ago required many. One particularly common and exemplary machine is the tractor, which has increased greatly in size, power, and in the many diverse attachments that are used to facilitate operations.

The commercial production of many agricultural crops involves the spraying of one or more chemicals such as herbicides, fertilizers, insecticides, or fungicides. The products being sprayed may be used to improve the health of the desired crop, or to eliminate or reduce detrimental interaction with diseases, pests, and competing weeds. To reduce the time required to apply these products to the crop, very large sprayers have been produced that carry a large liquid tank, a pump having a fluid inlet coupled into the liquid tank, at least one boom arm typically extending generally transversely to the direction of travel, and a plurality of spray nozzles supported by the boom and coupled through liquid supply lines to the pump outlet. The sprayer may be an attachment to a tractor, or an entirely separate machine. A person operating the sprayer will typically be able to control the pump to turn on or off the spray, and in many cases to control the pump pressure, which in turn controls the rate of delivery of the liquid to the crop. Through the use of this equipment, spraying of liquid chemicals is both time efficient and controllable to the needs of a particular crop, field, or even location within a field. As a result, a relatively precise amount of chemical may be applied rapidly to a large area.

As may be appreciated, the quantity of spray delivered to a crop can be relatively precisely controlled beneath the boom. When multiple passes are made across a field, for each pass the end of the boom arm can be located offset by the right amount from the previous pass to provide just the right amount of overlap in the spray coming out beyond the end of the boom. However, the sprayer will only pass over the edges of the field once. Consequently, adjacent to the edges of the field a tractor operator will normally make sure the last row of crop will be under the last sprayers, to ensure adequate liquid is delivered to this final row. Unfortunately, this also means that spray will be delivered beyond the last row of crop, typically on to adjacent plants. As may be appreciated, these adjacent plants are not a part of the desired crop, and so may include an adjacent field containing a different crop, a grass covered ditch, a neighboring property under different ownership, or undesirable weeds.

In the case of the application of an herbicide, the overspray onto a different crop, a grass covered ditch, or a neighboring property, those adjacent plants undesirably may be killed or seriously harmed by the spray. In the case of undesirable weeds, and since these weeds are not immediately under the boom and are instead being treated with overspray, the concentration of application is generally less than that intended for application to the field. As a result, the overspray may not be sufficient to kill the weeds, and so may instead lead to the development of weeds resistant to the spray. These weeds may then encroach upon the desired crop, hurting the yield or value of the harvested crop. Similar deficiencies may be encountered in the case of insecticides and fungicides, such as where adjacent insects may develop insecticide resistance. In the case of a fertilizer overspray, adjacent weeds may be undesirably strengthened and stimulated. Consequently, and for a variety of reasons, it is desirable to reduce or eliminate overspray adjacent to the edges of a field, while not interfering with the spray within the middle of the field.

To reduce the overspray, artisans have designed various shields that are designed to enclose a single row of crop. The spray nozzles are mounted to spray into the interior of the shield, and thereby avoid spray into the between row spaces and to prevent overspray. Exemplary U.S. patents and published applications, the teachings which are incorporated herein by reference, include: U.S. Pat. No. 3,445,961 by Elsworth, entitled "Agriculture spraying machines", which illustrates a pair of plastic guides that gently squeeze the plants together, and a liquid that is sprayed interior of the guides into the squeezed plants; and U.S. Pat. No. 4,947,581 by Claussen et al, entitled "Spray shield assembly", which illustrates a set of shields in the general shape of an upside-down "U" channel open on both ends but closed on the top and sides. For some applications, such as that of a fertilizer, either of these apparatus will reduce or avoid undesirable overspray on to other plants besides the agricultural crop. However, for other liquid applications, particularly herbicide applications, the entire field needs to be sprayed, making these shields useless for such applications. Furthermore, these shields must be set for a particular row spacing, meaning they will typically require resetting for each different species of crop. The variable height of different species and different stages of maturity are also challenging. Finally, there are many times when a spray will be most effectively sprayed by nozzles spraying at an angle closer to parallel to the ground than perpendicular thereto. Spray from relatively more horizontally pointing nozzles that misses the immediately adjacent row of crop, such as when the spray nozzle is pointing between sequential plants in a row, may still end up being applied to plants in a nearby row. In the case of a shield such as illustrated by either Elsworth or Claussen et al, any spray that misses the plant will instead be applied only to the shield, and from there will drip onto the soil without ever contacting the plant.

Additional U.S. patents illustrate fixed shields for crops, the relevant teachings and contents which are incorporated herein by reference, including: U.S. Pat. No. 2,589,020 by North, Jr, entitled "Spraying device"; U.S. Pat. No. 4,274,589 by Jones, entitled "Spraying apparatus employing a skirt structure"; U.S. Pat. No. 4,986,473 by Semple et al, entitled "Crop sprayer shield"; U.S. Pat. No. 5,139,200 by Greimann et al, entitled "Shield for agricultural sprayer"; U.S. Pat. No. 7,063,273 by Hahn et al, entitled "Spray delivery system"; and U.S. Pat. No. 8,573,510 by Bisson et al, entitled "Drift shroud system for spray booms of turf sprayer". Unfortunately, these prior art shields are quite large and designed to operate close to the ground, and so are susceptible to damaging interference with rocks, roots, mounds, and other obstacles in the ground. As with the Elsworth or Claussen et al shields, these shields are fixed in geometry. This means that even in the middle of the field, the farthest transverse edges (the left and right extremes) of the shields will undesirably block spray from reaching plants, and will instead drip the spray onto the earth. Any fixed shields that do not block the spray on the transverse edges will likewise not prevent the undesirable overspray discussed herein above.

Additional patents of varying relevance, the relevant teachings and contents which are incorporated herein by reference, include: U.S. Pat. No. 3,565,341 by Burroughs, entitled "Spraying apparatus"; U.S. Pat. No. 4,124,221 by Goings, entitled "Spray guard for vehicles"; U.S. Pat. No. 4,927,080 by Alsing, entitled "Field spraying device"; U.S. Pat. No. 5,062,572 by Reiter et al, entitled "Spray shield"; U.S. Pat. No. 5,549,457 by Flores et al, entitled "Pavement sprayer having movable spray guard"; U.S. Pat. No. 8,066,304 by Ulgen, entitled "Retractable mud flap for vehicles"; and Des 702,124 by Harrower et al, entitled "Rotatable spray shield device".

In addition to the foregoing patents, Webster's New Universal Unabridged Dictionary, Second Edition copyright 1983, is incorporated herein by reference in entirety for the definitions of words and terms used herein.

As may be apparent, in spite of the enormous advancements in agriculture and substantial research and development that has been conducted, there still remains a need for a spray shield that will permit efficient spraying in the middle of a field while also selectively blocking overspray at the field edges.

SUMMARY OF THE INVENTION

In a first manifestation, the invention is a retractable spray shield for agricultural use. The retractable spray shield has a liquid barrier film; a storage tube; a deployment and concealment drive; and a pivotal quick release support and boom arm coupling.

In a second manifestation, the invention is a selectively deployable spray shield for agricultural use. A spray barrier has a generally triangular and flaccid liquid barrier film, a pair of framing legs, each of the pair of framing legs coupled to an opposed edge of the liquid barrier film, a hinge plate, a first pintle coupling a first one of the pair of framing legs to the hinge plate, a second pintle coupling a second one of the pair of framing legs to the hinge plate, a spring guide post intermediate between the first and second pintles, and a tension spring wrapped about the spring guide post configured to operatively stretch the pair of framing legs apart from each other and thereby expand the spray shield toward a planar, generally triangular geometry. A storage tube defines a path for the hinge plate to reciprocate along, and is configured to receive and conceal the spray shield on an interior. A deployment and concealment drive has a motor, a ninety-degree gear box, a drive shaft, a chain, a drive sprocket coupled with the drive shaft and engaging the chain, a chain follower securely affixed to and reciprocated with the chain, an idler shaft distal on the storage tube relative to the drive shaft, an idler sprocket coupled with the idler shaft distal on the storage tube relative to the drive sprocket, and a pivotal link reciprocated with the chain follower. A pivotal quick release support and boom arm coupling has a boom arm coupling bracket, a pipe extending transverse to and passing through the storage tube, and a cotter pin selectively engaged and released from the pipe.

In a third manifestation, the invention is, in combination, an agricultural spray machine, an agricultural spray boom, and a retractable spray shield for agricultural use. The agricultural spray machine has an operator cab; an electrical system; a drive train; a liquid tank; and a pump receiving a liquid held within the liquid tank. The agricultural spray boom has a boom arm extending transverse to a forward direction of travel of the agricultural spray machine; and at least one spray nozzle suspended from the boom arm and in fluid communication with the pump. The retractable spray shield for agricultural use has a liquid barrier film; a storage tube; a deployment and concealment drive; and a pivotal quick release support and boom arm coupling.

OBJECTS OF THE INVENTION

Exemplary embodiments of the present invention solve inadequacies of the prior art by providing a retractable spray shield for agricultural use. The retractable spray shield has a liquid barrier film; a storage tube; a deployment and concealment drive that in one direction deploys the liquid barrier film from the storage tube and in a second direction opposed to the first direction conceals the liquid barrier film within the storage tube; and a pivotal quick release support and boom arm coupling.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide an apparatus that may be deployed to reduce or eliminate overspray adjacent to the edges of a field, and which may be concealed so as to not interfere with spray within the middle of the field. A second object of the invention is to enable the apparatus to be deployed or concealed from within the cab of a spray vehicle, without necessitating the operator to disembark from the cab. Another object of the present invention is to facilitate the spraying of a variety of fields, without the need for mechanical adjustment to a particular species, or plant height and maturity. A further object of the invention is to provide apparatus that is effective with a spray emanating generally at an angle closer to parallel to the ground than perpendicular thereto. Yet another object of the present invention is to achieve the foregoing objectives with an apparatus that is easily fabricated and which may be easily installed upon both new and existing spray boom arms.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred embodiment, the present invention provides a retractable spray shield 10 designed for agricultural use in combination with a prior art agricultural spray boom 1. Preferred embodiment retractable spray shield 10 comprises a spray shield 20, storage tube 30, deployment and concealment drive 40, and pivotal quick release support and boom arm coupling 50.

Figure 1:
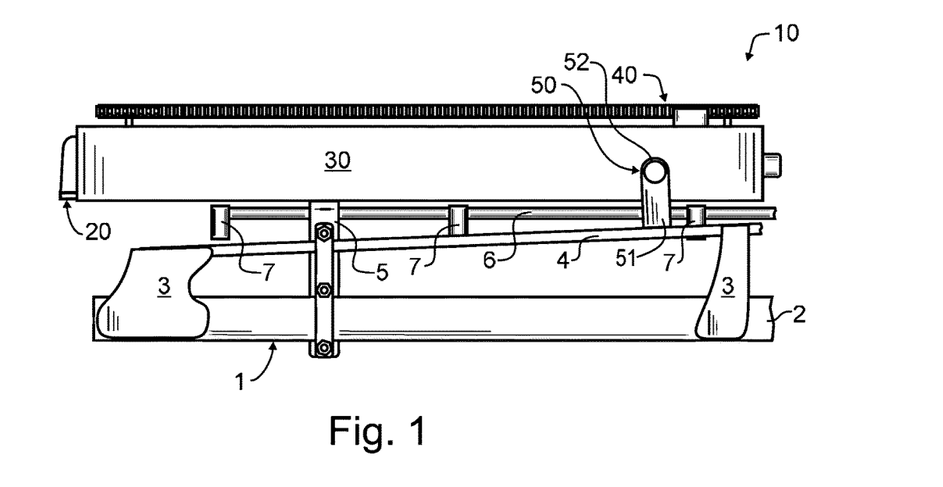
FIG. 1 illustrates a preferred embodiment retractable spray shield for agricultural use designed in accord with the teachings of the present invention in a concealed configuration and in combination with and affixed to a prior art agricultural spray boom, from a front elevational view.
Figure 2:
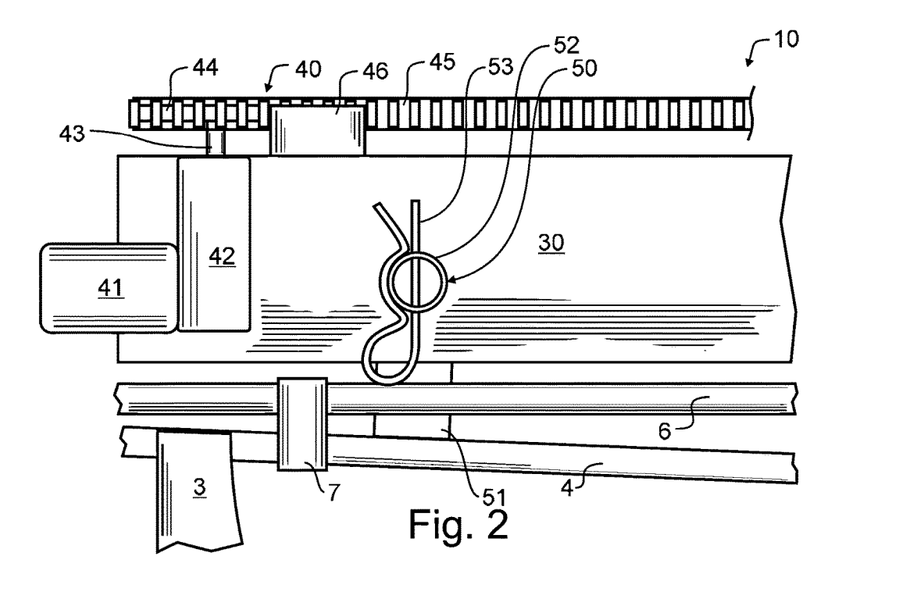
FIG. 2 illustrates the preferred embodiment retractable spray shield of FIG. 1 from an enlarged and partial rear elevational view.
Figure 3:
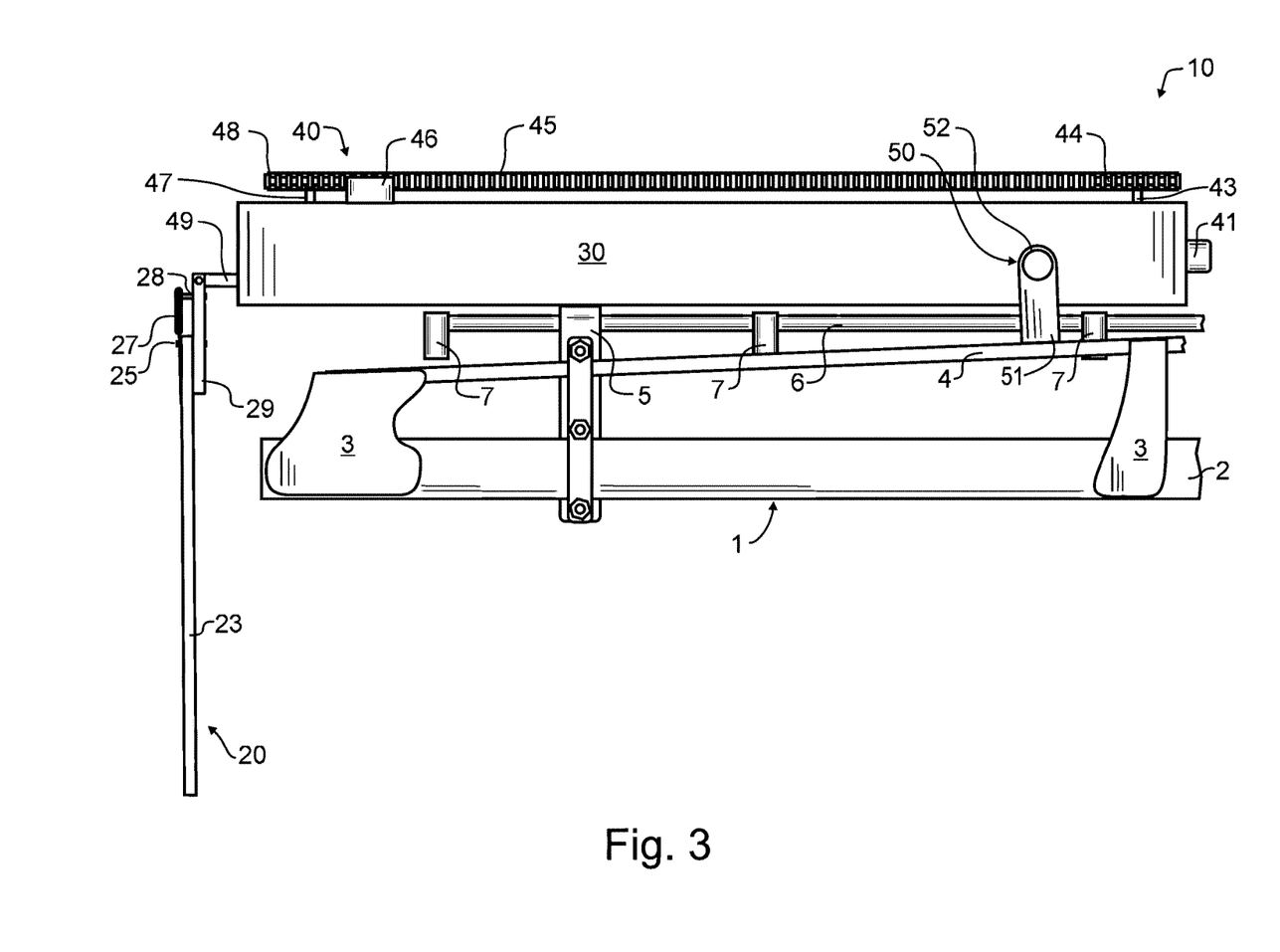
FIG. 3 illustrates the preferred embodiment retractable spray shield of FIG. 1 in a deployed configuration and in combination with and affixed to the agricultural spray boom, from a front elevational view.

As illustrated in FIGS. 1-3, prior art agricultural spray boom 1 may for exemplary purposes include a beam or truss comprising a bottom chord 2, a top chord 4, and a plurality of web members 3 coupling the bottom chord 2 and top chord 4 together. One or more "L"-shaped hangers 5 couple to the bottom and top chords 2, 4, and provide a support distal thereto for a liquid carrying pipe 6. Pipe 6 will be coupled at a first end to a pump as is known in the art, and has a plurality of spray nozzles 7 through which the liquid within pipe 6 may be dispersed over a field. While three spray nozzles 7 are illustrated in FIG. 1, it will be understood that any number of nozzles may be provided, and that these nozzles may be pointed in a plurality of directions.

Figure 4:
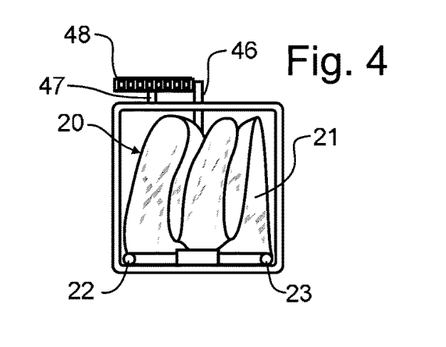
FIG. 4 illustrates the preferred embodiment retractable spray shield in the concealed configuration of FIG. 1 but without the prior art agricultural spray boom, from a side elevational view.
Figure 5:
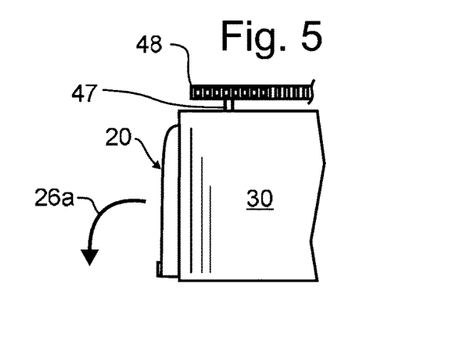
FIG. 5 illustrates the preferred embodiment retractable spray shield in the concealed configuration of FIG. 4, from a front elevational view and indicating the movement of the shield during deployment.
Figures 6, 7:
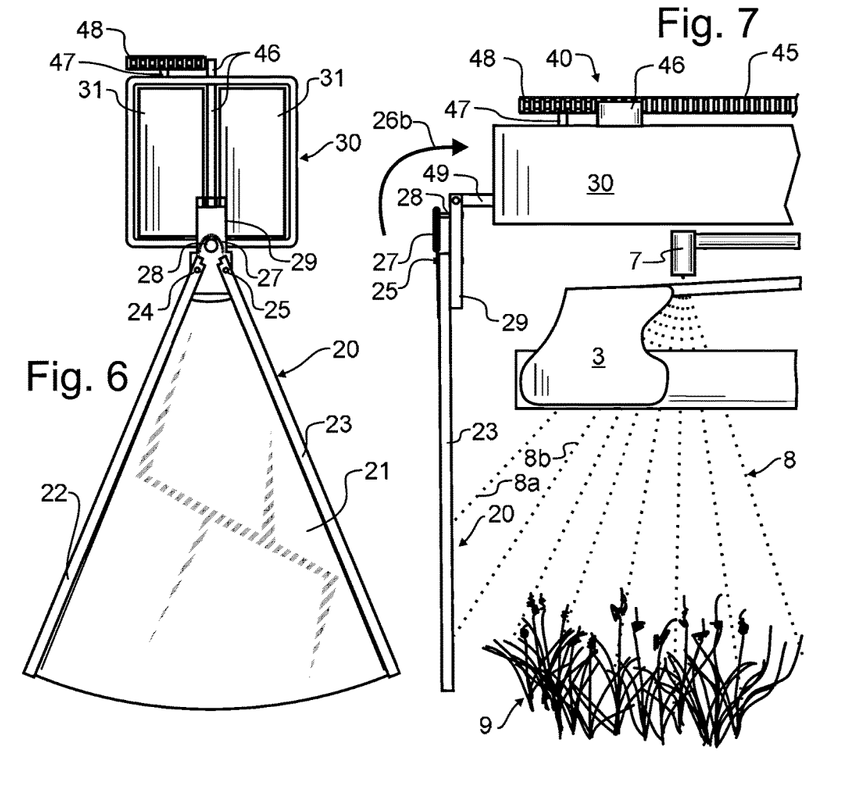
FIG. 6 illustrates the preferred embodiment retractable spray shield in the deployed configuration of FIG. 3 but without the prior art agricultural spray boom, from a side elevational view.
FIG. 7 illustrates the preferred embodiment retractable spray shield in the deployed configuration of FIG. 3 in combination with and affixed to a prior art agricultural spray boom in operation spraying a crop, from a front elevational view and indicating the movement of the shield during concealment.

Spray shield 20 is best illustrated in FIGS. 3-7. A relatively large and generally flaccid generally triangular-shaped liquid barrier film 21 serves to block the passage of any significant amount of liquid there through. While a liquid impervious and hydrophobic material such as plastic sheet manufactured from polyethylene terephthalate, polyethylene, or the like may be preferred for some applications, fabric incorporating any of a variety of materials will also be acceptable for some applications. One such fabric is known commercially as rip-stop nylon. Regardless of the material, liquid barrier film 21 must be sufficiently durable to withstand the force of the spray emanating from spray nozzles 7, to also withstand repeated collapsing as illustrated in FIG. 4, to withstand repeated fanning as illustrated in FIG. 6, and provide sufficient chemical resistance to withstand exposure to the variety of liquids that may be sprayed by prior art agricultural spray boom 1. Liquid barrier film 21 will also preferably have adequate ultra-violet resistance to withstand significant outdoor exposure.

A pair of framing legs 22, 23 are used to alternatively collapse and stretch liquid barrier film 21. These framing legs 22, 23 are pivotally affixed to hinge plate 29 through pintles 24, 25. Pintles 24, 25 may be any suitable pivot or hinge that permits framing legs 22, 23 to pivot with respect to hinge plate 29, and so for exemplary and non-limiting purpose may comprise shoulder bolts in combination with locking nuts passing through holes or bushing sleeves within framing legs 22, 23. A relatively larger diameter spring guide post 28 is provided about which tension spring 27 wraps. Tension spring 27 spans between framing legs 22, 23 and is aligned so that any pivoting of framing legs 22, 23 away from the position illustrated in FIG. 6 will stretch spring 27. This will increase the tension in spring 27, meaning spring 27 will resist such movement. As a result, under ordinary operating conditions where spray shield 20 is deployed, such as illustrated in FIGS. 6 and 7, tension spring 27 will hold liquid barrier film 21 in the expanded position best visible in FIG. 6. However, in the event of an unintentional impact with the earth or other object, framing legs 22, 23 are able to pivot, reducing the chance of permanent harm or damage. Tension spring 27 is illustrated as being helically wrapped, but any suitable tension spring that may span between framing legs 22, 23 while passing over spring guide post 28 may be substituted therefor.

Storage tube 30 serves as a receptacle within which spray shield 20 may be received for storage in an inactive state, and from which spray shield 20 may be deployed. While illustrated as a square tube, it will be appreciated that storage tube 30 may take other suitable geometry. Further, storage tube 30 is not required to be fully enclosed, and so may alternatively be open on the top and form a three-sided channel.

Mounted on top of storage tube 30 is deployment and concealment drive 40. Drive 40 includes a motor 41, ninety-degree gear box 42, drive shaft 43, sprocket 44, chain 45, chain follower 46, idler shaft 47, sprocket 48, and pivotal link 49. While a chain drive is illustrated and preferred, it will be apparent that other suitable drives may alternatively be used herein, such as but not limited to a belt drive, a hydraulic drive, or a helical shaft and threaded follower.

Motor 41 is most preferably a 12 VDC motor compatible with most farm machinery, allowing the motor to be powered directly from the sprayer electrical system without the need for conversion of electricity. While not illustrated, a double pole triple throw or double pole double throw center off switch will preferably be provided within the cab of the sprayer that permits the operator to disconnect power to the motor, or to energize the motor in either a forward or reverse direction.

Ninety-degree gear box 42 is optional, but provides compact and durable gear reduction, allowing motor 41 to be a relatively less expensive and more standard DC motor, and also increasing the output torque while reducing rotational speed. Nevertheless, motor 41 may directly drive the drive shaft 43, or may be coupled through a parallel axis gear reducer rather than the ninety-degree gear box 42. Sprocket 44 terminates drive shaft 43, and the teeth of sprocket 44 are configured to engage with and drive chain 45. Affixed securely to chain 45 is chain follower 46. Consequently, when drive chain 45 turns, chain follower 46 will move linearly along storage tube 30. While not essential to the present invention, chain follower 46 may run in a track at the bottom of or anywhere else within storage tube 30 distal to drive chain 45, if so desired for better stability. In preferred embodiment retractable spray shield 10, a pair of guide blocks 31 visible in FIG. 6 may sandwich and thereby prevent chain follower 46 from drifting within storage tube 30, and may also provide a linear bearing surface in contact with the wall of storage tube 30.

Adjacent the end of storage tube 30 distal to drive shaft 43 and sprocket 44 is idler shaft 47 that terminates with sprocket 48. As the name implies, idler shaft 47 will terminate in a journal distal to sprocket 48 to permit free rotation about the longitudinal axis. Consequently, idler shaft 47 and sprocket 48 simply maintain direction and tension within chain 45.

The construction of deployment and concealment drive 40 is similar to a garage door opener, including the provision of chain follower 46. Also like a garage door opener, some type of travel limit must be provided. The travel limit may be in the form of mechanical stops at each distal end of the travel of chain follower 46 that trigger a detectable force or torque that is used to shut off power to motor 41. However, electrical switches or position detectors adjacent each distal end of travel may be provided in alternative embodiments for the same purpose, or other suitable equivalent control may be provided.

While a chain drive is preferred for deployment and concealment drive 40, in alternative embodiments other types of drives may be incorporated, including but not limited to a belt drive, a screw drive defined by a helically threaded shaft and female threaded follower, or a linear hydraulic or pneumatic cylinder drive. The particular form of motive power will be determined by a designer. Nevertheless, and as noted herein above, the use of an electric drive in combination with chain 45 provides a robust drive that is familiar and readily serviced by most agricultural machinery operators, and which may be controlled using the existing electrical system of most sprayers.

Pivotal link 49 is coupled adjacent the end of chain follower 46 distal to chain 45. Pivotal link 49 allows the top of hinge plate 29 to climb above the bottom of storage tube 30 before rotating into longitudinal alignment parallel to the longitudinal axis of storage tube 30. Such motion necessarily occurs during retraction of spray shield 20, in the direction of travel illustrated by arrow 26*b* in FIG. 7. When chain follower 46 moves to the right in that Figure, pivotal link 49 will also move to the right. When hinge plate 29 contacts the entrance to storage tube 30, it will tilt to an angle intermediate between vertical and horizontal, and at that moment the junction between pivotal link 49 and hinge plate 29 will be elevated relative to the bottom of storage tube 30.

Pivotal quick release support and boom arm coupling 50 is designed for ready installation on a variety of prior art boom arms, whether such prior art boom arms resemble prior art agricultural spray boom 1 illustrated herein or not. Boom arm coupling bracket 51 is designed to on a first end be either clamped, welded, or otherwise affixed to top chord 4, while the distal end of the bracket is affixed to a pipe 52 extending transverse to top chord 4. Pipe 52, visible best in FIG. 2, preferably has a hole drilled through which a retainer such as a cotter pin 53 may pass. Pivotal quick release support and boom arm coupling 50 provides a first support. In preferred embodiment retractable spray shield 10, one or more "L"-shaped hangers 5 provide a second support surface upon which storage tube 30 will rest. In one alternative embodiment, storage tube 30 may be clamped or otherwise affixed to "L"-shaped hangers 5. In another alternative embodiment, storage tube 30 may be coupled through a second pivotal quick release support and boom arm coupling 50.

When desired, the entire assembly of preferred embodiment retractable spray shield 10 other than pivotal quick release support and boom arm coupling 50 may be removed from prior art agricultural spray boom 1 simply by pulling cotter pin 53 from pipe 52, and then sliding storage tube 30 off of pipe 52. With the provision of appropriate electrical connectors, and the disconnection thereof, this is all that is required to remove preferred embodiment retractable spray shield 10 from prior art agricultural spray boom 1.

The sequence of deployment and retraction of spray shield 20, and the functional operation thereof, is best illustrated in FIGS. 4-7. FIGS. 4 and 5 illustrate spray shield 20 in a fully retracted position, generally concealed within storage tube 30. Framing legs 22, 23 will spread from each other at the end adjacent to spring guide post 28, while coming together at the distal end as they are drawn into the interior of storage tube 30. This allows framing legs 22, 23 to move into nearly parallel orientation, appropriate for a storage position, while only nominally interfering with the side walls of storage tube 20. As noted herein above, this concealment is preferred, but in alternative embodiments for exemplary and non-limiting purpose, when storage tube 30 is a three-sided channel as described above, spray shield 20 may simply be retracted to an inactive position, while remaining visible. As also noted herein above, this pivoting of framing legs 22, 23 into nearly parallel orientation results in an increase of tension within tension spring 27, meaning tension spring 27 will be tending to oppose this retracted parallel position.

The arrow 26*a* of FIG. 5 illustrates the direction of travel of spray shield 20 during deployment. This movement is generated by chain follower 46 being moved by chain 45 in a direction generally away from drive shaft 43 and sprocket 44. As spray shield 20 exits storage tube 30, it will eventually start to drop distal to the open end of storage tube 30. This drop will continue until hinge plate 29 fully exits storage tube 30 and hangs down from adjacent the bottom of storage tube 30. This is the deployed position illustrated in FIGS. 6 and 7. In this position, tension spring 27 will pull the majority of framing legs 22, 23 apart, smoothing out liquid barrier film 21 into the deployed position of FIGS. 6 and 7. As may be recognized from FIG. 6, in this position liquid barrier film 21 is approximately triangular, with the narrow top point of the triangle immediately adjacent to storage tube 30. This narrow top point is therefore also immediately adjacent to top chord 4 and is very near to the most laterally displaced, or outermost, spray nozzle 7. In this location, the spray 8 emitted by a spray nozzle 7 has not had distance to fan out therefrom, meaning a narrow point is adequate to capture the bulk of spray 8 that would otherwise comprise overspray. Liquid barrier film 21 gets wider in the direction of travel of the spray vehicle as the distance increases downward and therefore away from spray nozzles 7. Since there will be increased dispersion of spray 8 with increased distance, this wider base to liquid barrier film 21 corresponds therewith.

In the deployed position of FIG. 7, spray shield 20 will not interfere with spray 8 emanating from nozzle 7 that is directed generally downward therefrom toward crop plants 9. However, spray emanating in a more horizontal direction generally parallel to the longitudinal axis of prior art agricultural spray boom 1, such as spray streams 8*a* and 8*b*, will contact liquid barrier film 21 or the pair of framing legs 22, 23, meaning spray nozzles 7 will effectively be blocked from overspraying in that direction.

When a pass along the edge of a field is complete, and the subsequent passes will be within the field rather than along an edge, then the operator will control the switch such that motor 41 will be driven to move chain follower 46 away from idler shaft 47 toward drive shaft 43. This retracts spray shield 20 in the direction of travel illustrated by arrow 26b in FIG. 7, allowing the spray nozzles 7 to again overspray adequately to ensure complete coverage within the middle of the field.

As may be apparent then, the operator simply switches the switch from within the spray vehicle cab to deploy preferred embodiment retractable spray shield 10 from the position of FIGS. 4 and 5 to the position of FIGS. 6 and 7, immediately in advance of prior art agricultural spray boom 1 passing adjacent to the field edge. When the field edge has been traversed, the operator again simply switches the switch from within the spray vehicle cab to retract spray shield 20.

A wide variety of materials may be used in the fabrication of preferred embodiment retractable spray shield 10, including spray shield 20, storage tube 30, deployment and concealment drive 40, and pivotal quick release support and boom arm coupling 50. These materials may include metals, polymers and resins, elastomers, glass and ceramic compositions, and laminates, composites, or combinations thereof. However, the materials should be selected to withstand the forces that will be encountered during use, the extremes and vagaries of temperature, weather, and sunlight, and the wear and tear that will be incurred during use.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. A retractable spray shield for agricultural use, comprising:
   a liquid barrier film;
   a storage tube;
   a deployment and concealment drive;
   a pivotal quick release support and boom arm coupling;
   wherein said deployment and concealment drive comprises:
     a motor;
     a gear box;
     a drive shaft;
     a chain;
     a drive sprocket coupled with said drive shaft and engaging said chain;
     a chain follower securely affixed to and reciprocated with said chain;
     an idler shaft distal on said storage tube relative to said drive shaft;
     an idler sprocket coupled with said idler shaft distal on said storage tube relative to said drive sprocket;
     a pivotal link reciprocated with and fixed to said chain follower;
   wherein said liquid barrier film is fixed to said pivotal link; and
   wherein said deployment and concealment drive deploys or conceals said liquid barrier film from said storage tube.

2. The retractable spray shield for agricultural use of claim 1, wherein said liquid barrier film further comprises a generally triangular and flaccid liquid barrier film.

3. The retractable spray shield for agricultural use of claim 2, wherein said liquid barrier film further comprises a pair of framing legs, each of said pair of framing legs coupled to an opposed edge of said liquid barrier film.

4. The retractable spray shield for agricultural use of claim 3, wherein said liquid barrier film further comprises:
   a hinge plate;
   a first pintle coupling a first one of said pair of framing legs to said hinge plate; and
   a second pintle coupling a second one of said pair of framing legs to said hinge plate.

5. The retractable spray shield for agricultural use of claim 1, wherein said pivotal quick release support and boom arm coupling further comprises:
   a boom arm coupling bracket;
   a pipe extending transverse to and passing through said storage tube; and
   a cotter pin selectively engaged and released from said pipe.

6. The retractable spray shield for agricultural use of claim 5, wherein said boom arm coupling bracket is configured to be coupled adjacent to an end of an agricultural sprayer boom arm.

7. A retractable spray shield for agricultural use, comprising:
   a generally triangular and flaccid liquid barrier film;
   a pair of framing legs, each of said pair of framing legs coupled to an opposed edge of said liquid barrier film;
   a hinge plate;
   a first pintle coupling a first one of said pair of framing legs to said hinge plate;
   a second pintle coupling a second one of said pair of framing legs to said hinge plate;
   a spring guide post intermediate between said first and second pintles;
   a tension spring wrapped about said spring guide post and configured to operatively stretch said pair of framing legs apart from each other and thereby expand said spray shield toward a planar, generally triangular geometry;
   a storage tube;
   a deployment and concealment drive; and
   a pivotal quick release support and boom arm coupling.

8. A retractable spray shield for agricultural use, comprising:
   a generally triangular and flaccid liquid barrier film;
   a pair of framing legs, each of said pair of framing legs coupled to an opposed edge of said liquid barrier film;
   a hinge plate;
   a first pintle coupling a first one of said pair of framing legs to said hinge plate;
   a second pintle coupling a second one of said pair of framing legs to said hinge plate;
   a storage tube;
   a deployment and concealment drive; and
   a pivotal quick release support and boom arm coupling;
   wherein said storage tube defines an interior path for said hinge plate to reciprocate along, and said storage tube is configured to receive and conceal said liquid barrier film within said interior.

9. A selectively deployable spray shield for agricultural use, comprising:
   a spray barrier having a generally triangular and flaccid liquid barrier film, a pair of framing legs, each of said pair of framing legs coupled to an opposed edge of said liquid barrier film, a hinge plate, a first pintle coupling a first one of said pair of framing legs to said hinge plate, a second pintle coupling a second one of said pair of framing legs to said hinge plate, a spring guide post intermediate between said first and second pintles, and a tension spring wrapped about said spring guide post configured to operatively stretch said pair of framing legs apart from each other and thereby expand said spray shield toward a planar, generally triangular geometry;

a storage tube defining a path for said hinge plate to reciprocate along, and configured to receive and conceal said spray shield on an interior;

a deployment and concealment drive having a motor, a ninety-degree gear box, a drive shaft, a chain, a drive sprocket coupled with said drive shaft and engaging said chain, a chain follower securely affixed to and reciprocated with said chain, an idler shaft distal on said storage tube relative to said drive shaft, an idler sprocket coupled with said idler shaft distal on said storage tube relative to said drive sprocket, and a pivotal link reciprocated with said chain follower; and a pivotal quick release support and boom arm coupling having a boom arm coupling bracket, a pipe extending transverse to and passing through said storage tube, and a cotter pin selectively engaged and released from said pipe.

10. The retractable spray shield for agricultural use of claim 9, wherein said boom arm coupling bracket is configured to be coupled adjacent to an end of an agricultural sprayer boom arm.

11. In combination, an agricultural spray machine, an agricultural spray boom, and a retractable spray shield for agricultural use,
the agricultural spray machine having:
an operator cab;
an electrical system;
a drive train;
a liquid tank; and
a pump receiving a liquid held within said liquid tank;
the agricultural spray boom having:
a boom arm extending transverse to a forward direction of travel of said agricultural spray machine; and
at least one spray nozzle suspended from said boom arm and in fluid communication with said pump;
the retractable spray shield for agricultural use having:
a liquid barrier film;
a storage tube;
a deployment and concealment drive;
and a pivotal quick release support and boom arm coupling;
wherein said deployment and concealment drive further comprises:
a motor;
a gear box;
a drive shaft;
a chain;
a drive sprocket coupled with said drive shaft and engaging said chain;
a chain follower securely affixed to and reciprocated with said chain;
an idler shaft distal on said storage tube relative to said drive shaft;
an idler sprocket coupled with said idler shaft distal on said storage tube relative to said drive sprocket; and a pivotal link reciprocated with and fixed to said chain follower;
wherein said liquid barrier film is fixed to said pivotal link; and
wherein said deployment and concealment drive deploys or conceals said liquid barrier film from said storage tube.

12. The combination agricultural spray machine, agricultural spray boom, and retractable spray shield for agricultural use of claim 11, wherein said liquid barrier film further comprises a generally triangular and flaccid liquid barrier film.

13. The combination agricultural spray machine, agricultural spray boom, and retractable spray shield for agricultural use of claim 12, further comprising a pair of framing legs, each of said pair of framing legs coupled to an opposed edge of said liquid barrier film.

14. The combination agricultural spray machine, agricultural spray boom, and retractable spray shield for agricultural use of claim 13, further comprising:
a hinge plate;
a first pintle coupling a first one of said pair of framing legs to said hinge plate; and
a second pintle coupling a second one of said pair of framing legs to said hinge plate.

15. The combination agricultural spray machine, agricultural spray boom, and retractable spray shield for agricultural use of claim 11, wherein said pivotal quick release support and boom arm coupling further comprises:
a boom arm coupling bracket;
a pipe extending transverse to and passing through said storage tube; and
a cotter pin selectively engaged and released from said pipe.

16. The retractable spray shield for agricultural use of claim 15, wherein said boom arm coupling bracket is configured to be coupled adjacent to an end of said agricultural sprayer boom arm distal to said pump.

17. In combination, an agricultural spray machine, an agricultural spray boom, and a retractable spray shield for agricultural use,
the agricultural spray machine having:
an operator cab;
an electrical system;
a drive train;
a liquid tank; and
a pump receiving a liquid held within said liquid tank;
the agricultural spray boom having:
a boom arm extending transverse to a forward direction of travel of said agricultural spray machine; and
at least one spray nozzle suspended from said boom arm and in fluid communication with said pump;
the retractable spray shield for agricultural use having:
a generally triangular and flaccid liquid barrier film;
a pair of framing legs, each of said pair of framing legs coupled to an opposed edge of said liquid barrier film;
a hinge plate;
a first pintle coupling a first one of said pair of framing legs to said hinge plate;
a second pintle coupling a second one of said pair of framing legs to said hinge plate;
a spring guide post intermediate between said first and second pintles;
a tension spring wrapped about said spring guide post and configured to operatively stretch said pair of framing legs apart from each other and thereby expand said spray shield toward a planar, generally triangular geometry;

a storage tube;

a deployment and concealment drive; and a pivotal quick release support and boom arm coupling.

18. In combination, an agricultural spray machine, an agricultural spray boom, and a retractable spray shield for agricultural use, the agricultural spray machine having:
 an operator cab;
 an electrical system;
 a drive train;
 a liquid tank; and
 a pump receiving a liquid held within said liquid tank;

the agricultural spray boom having:
 a boom arm extending transverse to a forward direction of travel of said agricultural spray machine; and
 at least one spray nozzle suspended from said boom arm and in fluid communication with said pump;

the retractable spray shield for agricultural use having:
 a generally triangular and flaccid liquid barrier film;
 a pair of framing legs, each of said pair of framing legs coupled to an opposed edge of said liquid barrier film;
 a hinge plate;
 a first pintle coupling a first one of said pair of framing legs to said hinge plate;
 a second pintle coupling a second one of said pair of framing legs to said hinge plate;
 a storage tube;
 a deployment and concealment drive; and
 a pivotal quick release support and boom arm coupling;

wherein said storage tube defines an interior path for said hinge plate to reciprocate along, and said storage tube is configured to receive and conceal said liquid barrier film within said interior.

* * * * *